United States Patent
Kawano

(10) Patent No.: US 7,560,849 B2
(45) Date of Patent: Jul. 14, 2009

(54) MOTOR VEHICLE AC GENERATOR HAVING SUBSTANTIALLY IDENTICAL RATES OF WEAR OF THE GENERATOR BRUSHES

(75) Inventor: Yusuke Kawano, Nagoya (JP)

(73) Assignee: Denso Corporation, Kariya (JP)

( * ) Notice: Subject to any disclaimer, the term of this patent is extended or adjusted under 35 U.S.C. 154(b) by 418 days.

(21) Appl. No.: 11/510,571

(22) Filed: Aug. 28, 2006

(65) Prior Publication Data
US 2007/0080603 A1    Apr. 12, 2007

(30) Foreign Application Priority Data
Oct. 11, 2005   (JP)   ............... 2005-296797

(51) Int. Cl.
*H01R 39/08*   (2006.01)
*H01R 39/18*   (2006.01)
(52) U.S. Cl. .............. 310/242; 310/248
(58) Field of Classification Search ........ 310/242, 310/245, 247, 248, 251, 252
See application file for complete search history.

(56) References Cited

U.S. PATENT DOCUMENTS

| | | | | |
|---|---|---|---|---|
| 3,735,173 A | * | 5/1973 | Wisniewski | ........ 310/242 |
| 4,841,182 A | * | 6/1989 | Tsuchiya et al. | ........ 310/68 D |
| 5,744,890 A | * | 4/1998 | Yamaguchi et al. | ........ 310/248 |
| 6,806,603 B1 | * | 10/2004 | Choi et al. | ........ 310/81 |
| 2005/0200228 A1 | | 9/2005 | Ogi | |

FOREIGN PATENT DOCUMENTS

| | | |
|---|---|---|
| JP | A 9-182353 | 7/1997 |
| JP | A 2005-261153 | 9/2005 |

* cited by examiner

*Primary Examiner*—Tran N Nguyen
(74) *Attorney, Agent, or Firm*—Oliff & Berridge, PLC

(57) ABSTRACT

In an AC generator of a motor vehicle, having a positive polarity brush from which current flows into a corresponding slip ring and a negative polarity brush into which current flows from the corresponding slip ring, the brushes or the springs of the brushes are configured respectively differently, to achieve substantially identical rates of wear for the brushes. This is done for example by increasing the area of contact between the negative polarity brush and its slip ring, lengthening the negative polarity brush, or decreasing the amount of force applied by the spring of the negative polarity brush.

11 Claims, 4 Drawing Sheets

MOTOR VEHICLE AC GENERATOR HAVING SUBSTANTIALLY IDENTICAL RATES OF WEAR OF THE GENERATOR BRUSHES

CROSS-REFERENCE TO RELATED APPLICATIONS

This application is based on and incorporates herein by reference Japanese Patent Application No. 2005-296797 filed on Oct. 11, 2005.

BACKGROUND OF THE INVENTION

1. Field of Application

The present invention relates to an AC generator, generally referred to as an alternator, of a vehicle such as an automobile or truck. In particular, the invention relates to the brush apparatus of such an alternator.

2. Description of Related Art

The brush apparatus of the alternator of a vehicle incorporates a pair of brushes held in sliding contact and in electrical contact with respective slip rings that are mounted on the rotor of the generator. Current flows from one of these brushes (referred to in the following as the positive polarity brush), from a high (positive) power supply potential, into the corresponding slip ring, and the current flows from the other brush (referred to in the following as the negative polarity brush) into the corresponding slip ring, and hence to the low power supply potential. The slip rings corresponding to the positive polarity brush and the negative polarity brush will be respectively referred to as the positive polarity slip ring and negative polarity slip ring.

Hitherto, such a pair of brushes have been generally formed of identical materials and with identical configurations, for example as described in Japanese patent publication No. 9-182353 (pages 4-8), FIGS. 1-8).

Over a long period of use, wear occurs at the area of contact between such a brush and the corresponding slip ring. The operating life of a brush (more accurately, the operating life of the combination of that brush with the corresponding slip ring) until the brush becomes defective as a result of such contact wear, will be referred to in the following as the wear-down lifetime of the brush. Due to the fact electrical current flows in respectively opposite directions through the pair of brushes, the negative polarity brush and positive polarity brush have respectively different wear-down lifetimes. Thus there is the problem that when one of the brushes (more specifically, the combination of a brush and the corresponding slip ring) reaches the end of its wear-down lifetime, the alternator as a whole becomes inoperable. Hence the operating life of the alternator is shortened.

In Japanese patent publication No. 2005-261153, it is proposed to overcome this problem by forming the slip rings from respectively different materials, with the slip ring corresponding to the brush having the more rapid rate of wear being formed of a metallic material that has greater resistance to wear than the material of the other slip ring. However such a method has basic disadvantages.

Firstly, if the metallic material having greater resistance to wear is for example stainless steel, then the material has a substantially higher electrical resistivity than a material such as copper. This will result in an amount of lowering of the output power of the alternator, to an extent that cannot be ignored.

Secondly, with the usual method of manufacture of the slip rings for an alternator, a single elongated ring is formed in a mold, then a central part of the ring is removed by machining, to form the negative polarity-side slip ring and positive polarity-side slip ring. However if the slip rings are formed of respectively different materials, then it becomes necessary to provide separate molds for the pair of slip rings, and to form these in the molds to a high degree of accuracy of axial concentricity. Hence, the molding process becomes slower and more complex, and the manufacturing cost will thereby be increased.

Thirdly, it is necessary to electrically connect the slip rings to the field winding of the generator by welding or soldering attachment of connecting leads to the slip rings. However if the negative polarity-side slip ring and positive polarity-side slip ring are of respectively different metallic materials, then it becomes necessary to provide two separate installations for performing such attachment operations, since the requirements for performing the welding or soldering work will be respectively different for the two types of metallic material. Thus since the work cannot be performed by using a single installation for performing the welding or soldering attachment operations, the manufacturing cost will be increased.

Fourthly, if the negative polarity-side slip ring and positive polarity-side slip ring are of respectively different metallic materials, then it becomes necessary to provide two separate installations for performing machining work to form the slip rings, since the machining requirements will be respectively different for the two types of metallic material. Hence, the manufacturing cost will be increased.

SUMMARY OF THE INVENTION

It is an objective of the present invention to overcome the above problem, by providing an AC generator for a motor vehicle whereby the operating life of the AC generator can be lengthened without a reduction of the power output level of the generator and without an increase in manufacturing cost.

To achieve the above objective, the invention provides a vehicle AC generator for a vehicle, having a field winding that is wound on a rotor iron core, a rotor shaft with a negative polarity slip ring and a positive polarity slip ring mounted circumferentially thereon and respectively electrically connected to opposite ends of said field winding, a negative polarity brush and a positive polarity brush that are held in sliding contact with the respective outer circumferences of said negative polarity slip ring and positive polarity slip ring, and a negative polarity spring and positive polarity spring for respectively urging the negative polarity brush and positive polarity brush against the corresponding slip rings. With such an AC generator, the operating life of each brush is determined by the degree of wear that occurs due to said sliding against the corresponding slip ring. According to a first aspect, the invention is characterized in that each of said negative polarity slip ring and said positive polarity slip ring are formed of an identical material, while said negative polarity brush and said positive polarity brush are constituted respectively differently, such that said negative polarity brush and positive polarity brush substantially identical operating lifetimes.

This can be achieved by forming the negative polarity brush and positive polarity brush to have respectively different sizes of contact area with the corresponding slip rings. In that way, the respective wear-down lifetimes of the brushes can be made substantially identical, i.e., by increasing the size of the slip ring contact area of the one of the brushes which would otherwise wear more rapidly, the wear-down lifetime of that brush can be appropriately extended, so that the operating life of the alternator as a whole can be correspondingly extended Preferably, the negative polarity brush is shaped such as to increase the contact area between that brush and the negative polarity slip ring, by comparison with the contact area between the positive polarity brush and the positive polarity slip ring.

That increase in contact area can be achieved by increasing the length of the negative polarity brush by comparison with that of the positive polarity brush, such that the wear-down lifetime of the negative polarity brush is made substantially identical to that of the positive polarity brush.

As a second alternative, the objective can be achieved by forming the brushes from respectively different materials. Specifically, the negative polarity brush is preferably formed from a material having a higher resistance to wear than does the material of the positive polarity brush. When the brushes are formed of a material that includes a proportion of copper, the objective can be achieved by making the proportion of copper contained in the material of the negative polarity brush higher than that contained in the material of the positive polarity brush.

As another alternative, the objective of the invention can be achieved by arranging that the level of force applied to the negative polarity brush by a spring which urges that brush against the negative polarity slip ring is made lower than the corresponding level of force applied by a spring that acts on the positive polarity brush. This can be done (without otherwise altering the configuration and components of the alternator) by increasing the pitch of the coils in the negative polarity spring in relation to that of the positive polarity spring, or forming the negative polarity spring of material that is more flexible than that of the positive polarity spring, for example.

As summarized above, the objective of the invention can be achieved simply by altering the shape or the constituent material of one of the brushes or of one of the springs, and the slip rings can each be formed of an identical material. Hence the objective can be achieved without a lowering of the power output capability or a significant increase in manufacturing cost of the alternator, in particular by comparison with an alternator in which the slip rings are formed of respectively different materials.

DESCRIPTION OF PREFERRED EMBODIMENTS

Figure 1:
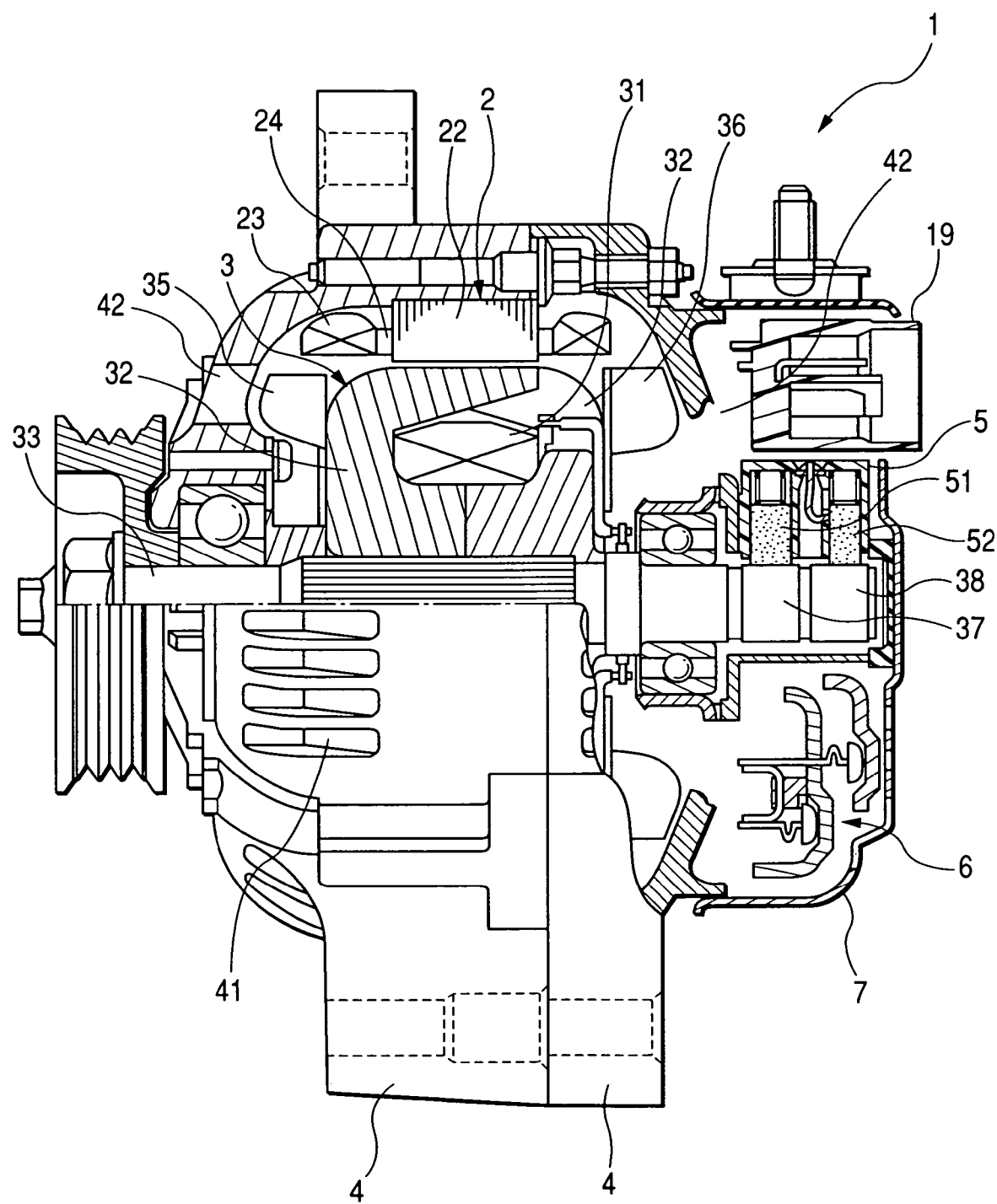
FIG. 1 shows a side view of an embodiment of an alternator for a motor vehicle, taken partially in cross-section.

FIG. 1 shows the overall configuration of an embodiment of an alternator for a vehicle, seen in side view in partial cross-section. The alternator 1 includes a stator 2, a rotor 3, a frame 4, a brush apparatus 5, a rectifier apparatus 6 and a rear cover 7.

The stator 2 is made up of a stator iron core 22, a stator winding 23 and an insulator 24 which is located between the stator iron core 22 and stator winding 23 for electrical insulation. The rotor 3 includes a field winding 31 which is a tubular concentric wave-wound coil formed of insulation-covered copper wire, which is enclosed at opposing ends of the rotor shaft 33 by opposing pole cores 32. The pole cores 32 function as the rotor iron core, and each is formed with six claw-shaped portions. A cooling fan 35 is fixedly attached by welding, etc., to the front side of the front-end one of the pole cores 32, for impelling a flow of cooling air that is drawn in through the front end (i.e., left-side end, as seen in FIG. 1) of the alternator 1, with the air moving along axial and radial directions. Similarly, a cooling fan 36 is fixedly attached by welding, etc., to the rear side of the rear-end one of the pole cores 32, for impelling a flow of cooling air that is drawn in through the rear end of the alternator 1, with the air moving along a radial direction.

A negative polarity slip ring 37 and a positive polarity slip ring 38, each formed of an identical material, are mounted on the circumference of the rotor shaft 33 near the rear end of that shaft and are respectively connected to opposing ends of the field winding 31 for supplying an excitation current to the field winding 31, with that current flowing through the slip rings 37 and 38 and a brush apparatus 5.

The frame 4 encloses the stator 2 and the rotor 3, with the rotor shaft 33 of the rotor 3 being rotatably supported by the frame 4 and with a fixed air gap established between the stator 2 and the outer circumference of the pole cores 32 of the rotor 3. The frame 4 is formed with intake apertures 41 and outlet apertures 42, to pass the aforementioned flows of cooling air.

The brush apparatus 5 serves to supply a flow of excitation current from the rectifier apparatus 6 to the field winding 31 of the rotor 3. The slip rings 37 and 38 are respectively fixedly attached circumferentially on the rotor shaft 33 of the rotor 3, with the negative polarity brush 51 and the positive polarity brush 52 being respectively held in sliding contact with the slip rings 37 and 38. The structure of the brush apparatus 5 will be described in detail hereinafter.

The rectifier apparatus 6 is a 3-phase rectifier for rectifying a 3-phase output voltage that is generated by the stator winding 23. The rear cover 7 covers components of the alternator 1 including the brush apparatus 5, the rectifier apparatus 6, the IC regulator 9, etc., that are mounted on the outer side of the rear-end part of the frame 4, to protect these components.

Figure 2:
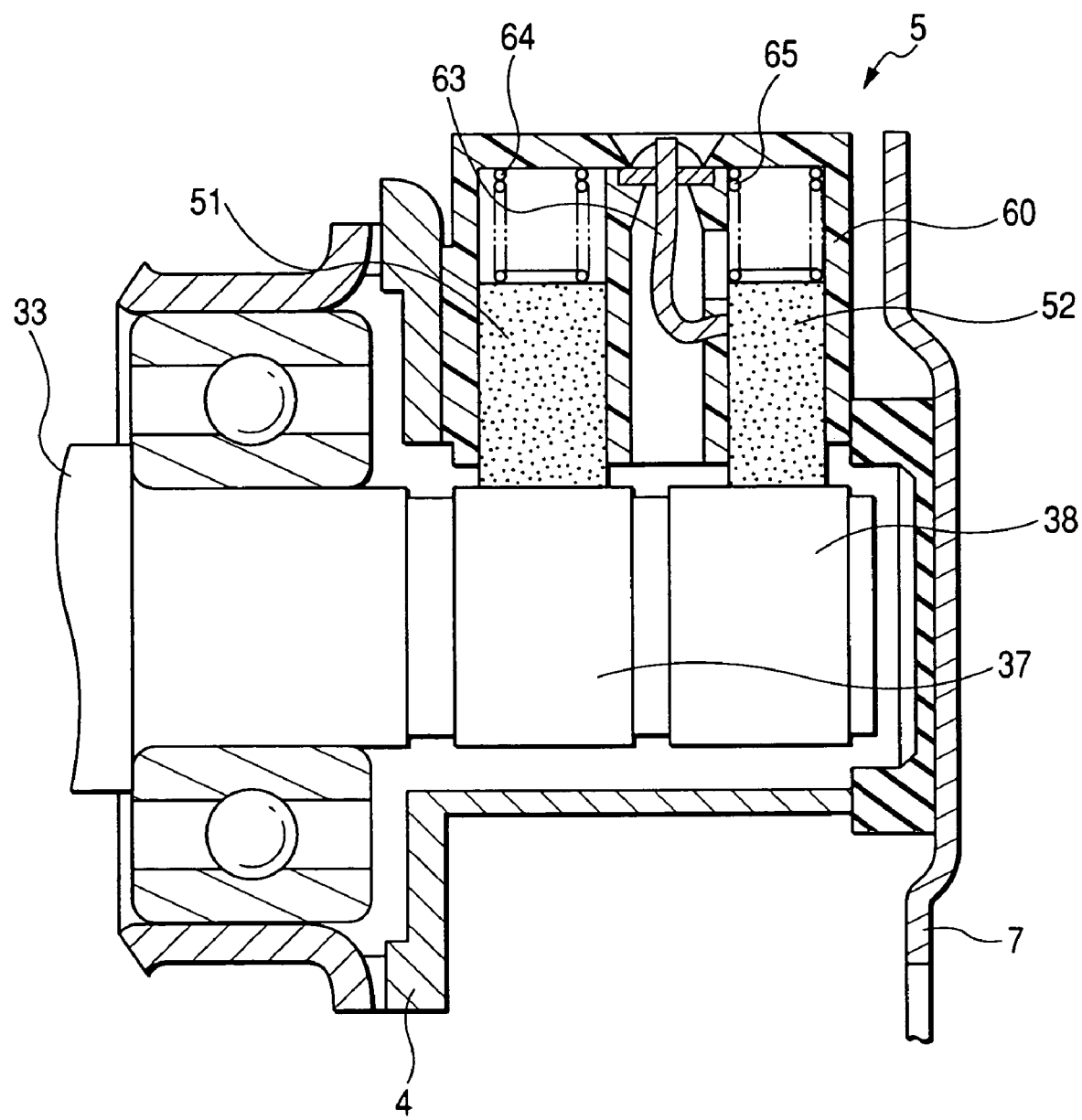
FIG. 2 is an expanded view of a portion of FIG. 1, showing details of a brush apparatus.

The structure of the brush apparatus 5 is illustrated in the expanded partial cross-sectional view of FIG. 2, which shows the brush apparatus 5 installed in the alternator 1. The brush apparatus 5 is made up of a brush holder 60 which is formed of molded plastic and has contact terminals embedded therein, a negative polarity brush 51 and a positive polarity brush 52, pigtails 63 which electrically connect the brushes 51, 52 to the contact terminals, a negative polarity spring 64 and a positive polarity spring 65.

An output voltage (i.e., unsmoothed DC voltage) that is applied to the positive polarity brush 2 from the rectifier apparatus 6 is higher (more positive) than the voltage applied to the negative polarity brush 51. Each of the negative polarity brush 51 and positive polarity brush 52 is of oblong rectangular form, with the face that is in contact with the corresponding one of the slip rings 37 and 38 being formed with a curve that matches the outer circumference of the slip ring. The negative polarity spring 64 and a positive polarity spring 65 are respectively disposed opposite the curved contact faces of the negative polarity brush 51 and positive polarity brush 52, for urging the corresponding brush into contact with the corresponding slip ring with a predetermined amount of force.

Each of the negative polarity brush 51 and positive polarity brush 52 is formed of carbon powder as a main constituent, into which a proportion of copper powder is mixed.

The present invention provides four methods for ensuring that the respective wear-down lifetimes (as defined hereinabove) of the negative polarity brush 51 and positive polarity brush 52 can be made substantially identical.

Method 1

With the first method, the area of contact between the negative polarity brush 51 and the negative polarity slip ring 37 is made different from that between the positive polarity brush 52 and the positive polarity slip ring 38. By increasing the area of a brush face that is in contact with a slip ring, the rate of wear of the brush, due to rubbing against the slip ring, can be reduced. Specifically, the contact area between the negative polarity brush 51 and the negative polarity slip ring 37 (i.e., the area of the curved face of the negative polarity brush 51) is made greater than the contact area between the positive polarity brush 52 and the positive polarity slip ring 38.

Figure 3:
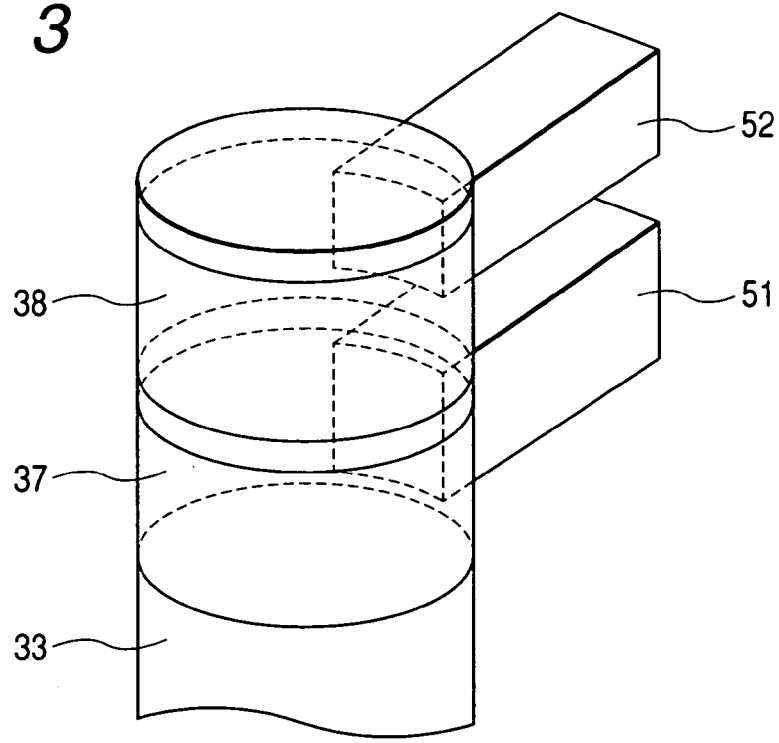
FIG. 3 conceptually illustrates a manner of establishing respectively different sizes of an area of contact between brush and slip ring, for the brushes in the apparatus of FIG. 2.

As illustrated in FIG. 3, this can be accomplished by increasing a width dimension of the negative polarity brush 51 (which otherwise will have a higher rate of wear than the positive polarity brush 52, as described hereinabove) as measured along a direction parallel to the axis of the rotor shaft 33, i.e., a direction at right angles to the direction of force applied to the negative polarity brush 51 by the negative polarity spring 64. The axial length of the curved face of the negative polarity brush 51 is thereby increased, so that the contact area between the negative polarity brush 51 and negative polarity slip ring 37 is increased.

Figure 4:
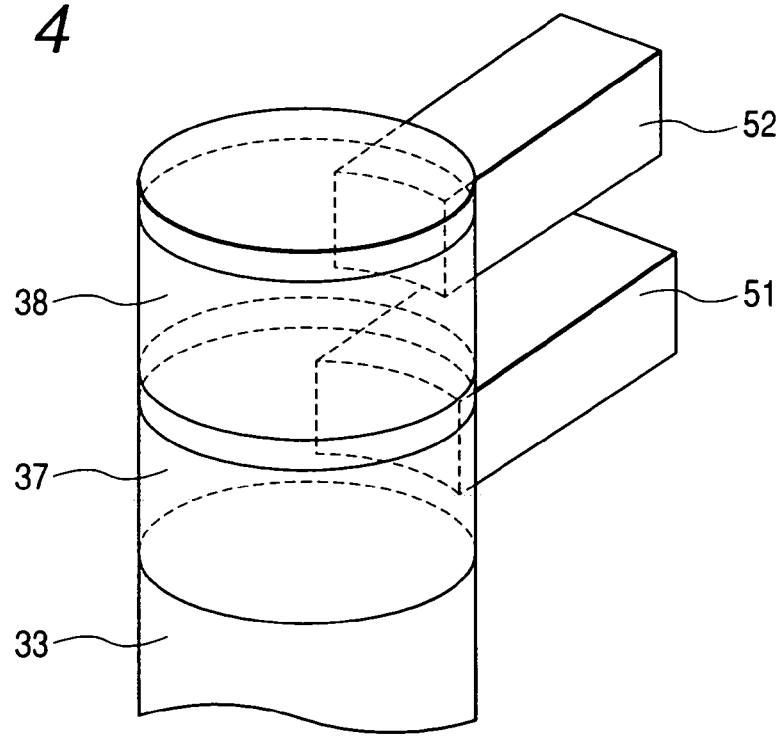
FIGS. 4 and 5 conceptually illustrate alternative manners of establishing respectively different sizes of an area of contact between brush and slip ring, for the brushes in the apparatus of FIG. 2.
Figure 5:
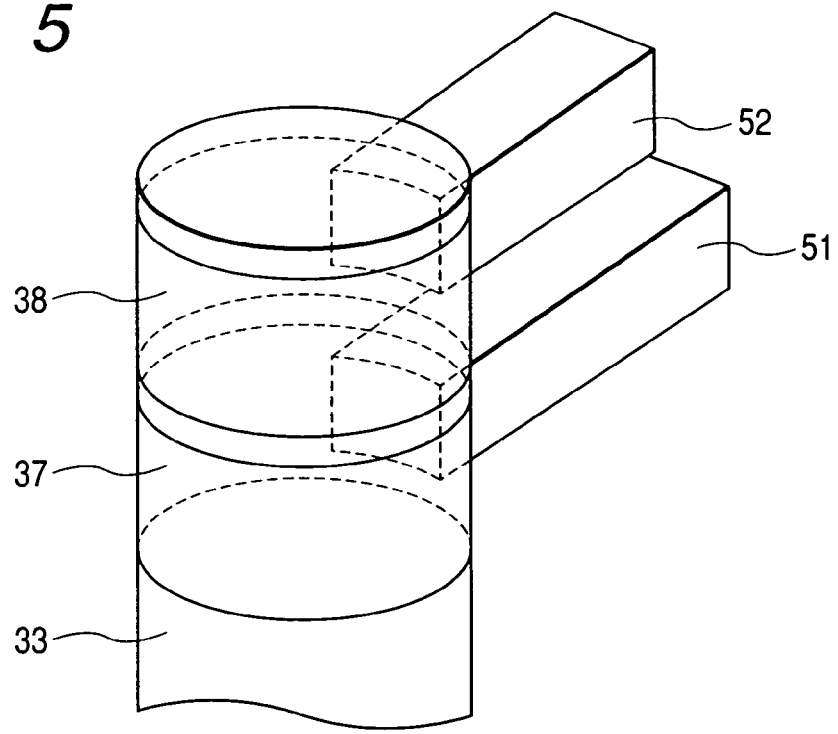

Alternatively as illustrated in FIG. 4 this can be accomplished by increasing a width dimension of the negative polarity brush 51, as measured along a direction at right angles to the axis of the rotor shaft 33 and at right angles to the direction of force applied to the negative polarity brush 51 by the negative polarity spring 64. The circumferential length of the curved face of the negative polarity brush 51 is thereby increased, so that the contact area between the negative polarity brush 51 and negative polarity slip ring 37 is increased. By increasing that contact area by an appropriate amount in relation to that of the positive polarity brush 52, the wear-down lifetime of the negative polarity brush 51 can be made substantially identical to that of the positive polarity brush 52.

As a further alternative, it would be possible to increase both of the above dimensions of the negative polarity brush 51, to increase the contact area by an appropriate amount.

Method 2

With the second method, the lengths (i.e., dimension measured along the direction in which force is applied by the corresponding one of the springs 64, 65) of the negative polarity brush 51 and positive polarity brush 52 are made respectively different. Specifically, the length of the negative polarity brush 51 is made greater than that of the positive polarity brush 52, as illustrated in FIG. 4. By increasing the length of the negative polarity brush 51 by an appropriate amount in relation to that of the positive polarity brush 52, the wear-down lifetime of the negative polarity brush 51 can be made substantially identical to that of the positive polarity brush 52.

Method 3

With the third method, the brushes 51, 52 are formed of respectively different materials, with one material having a higher resistance to wear than the other material. Specifically, the negative polarity brush 51 is preferably formed of a material having a higher resistance to wear than the material of the positive polarity brush 52.

For example when the brush material consists of a substance such as graphite with an admixture of copper powder, then the proportion of copper in the material used to constitute the negative polarity brush 51 is made greater than the proportion of copper in the material of the positive polarity brush 52. In that way, by appropriately increasing the resistance to wear of the material used for the negative polarity brush 51, by comparison with that of the material of the positive polarity brush 52, the wear-down lifetime of the negative polarity brush 51 can be made substantially identical to that of the positive polarity brush 52.

Method 4

With the fourth method, the springs corresponding to the negative polarity brush 51 and positive polarity brush 52 are manufactured to exert respectively different levels of force. Specifically, the spring that acts on the negative polarity brush 51 is formed such as to exert a smaller amount of force than the spring corresponding to the positive polarity brush 52.

Figure 6:
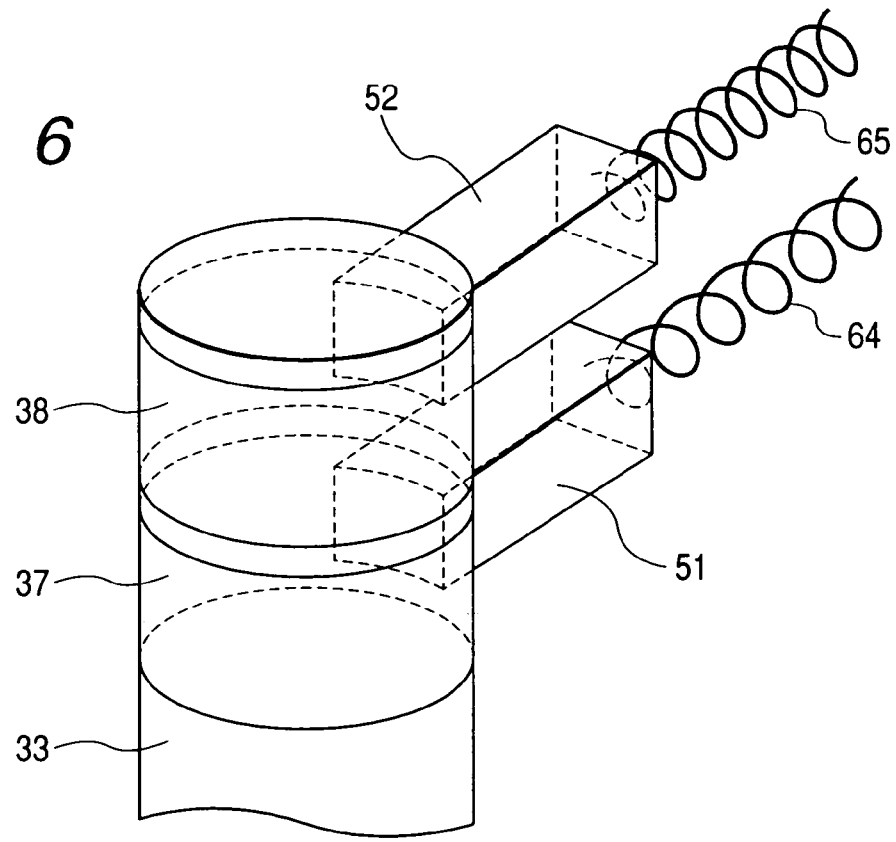
FIG. 6 conceptually illustrates a manner of applying respectively different values of spring force to the brushes in the apparatus of FIG. 2.

As illustrated in FIG. 6, this can for example be accomplished by increasing the pitch of the coils of the spring 64, corresponding to the negative polarity brush 51, by comparison with that of the spring 65 corresponding to the positive polarity brush 52, i.e., the number of turns per unit length of the spring 65 is made greater than for the spring 64.

Alternatively, it is possible to achieve the same result by using an identical coil pitch for each of the springs 64, 65, but making the diameter of the spring 64 smaller than that of the spring 65.

As a further alternative, the springs 64, 65 can be of identical configurations, but with the spring 64 formed of a material that is more flexible than the material used to form the spring 65.

By using one or a combination of the above techniques to appropriately decrease the level of spring force applied to the negative polarity brush 51 by comparison with the spring force applied to the positive polarity brush 52, the wear-down lifetime of the negative polarity brush 51 can be made substantially identical to that of the positive polarity brush 52.

As can be seen from the above embodiments, the objectives of the invention can be achieved by a simple modification of the shape or constituent material of a brush or a spring of the alternator, while each of the slip rings can be formed of an identical material, so that that there will be no reduction of power output or any significant increase in manufacturing cost, by comparison with a conventional alternator.

It should be understood that although various different methods of rending the wear-down lifetime of the negative polarity brush 51 substantially identical to that of the positive polarity brush 52 have been described separately above, it would possible to combine two or more of these methods to achieve the objectives of the invention. The above description should thus be understood in a descriptive and not in a limiting sense.

What is claimed is:

1. An AC generator for a vehicle, comprising a field winding that is wound on a rotor iron core, a rotor shaft having said rotor iron core mounted thereon, a negative polarity slip ring and a positive polarity slip ring which are each formed of an identical material and are mounted on a circumference of said rotor shaft and respectively electrically connected to opposite ends of said field winding, a negative polarity brush and a positive polarity brush that are held in sliding contact with respective outer circumferences of said negative polarity slip ring and positive polarity slip ring, a negative polarity spring for applying a predetermined amount of force acting to urge said negative polarity brush into contact with said negative polarity slip ring circumference, and a positive polarity spring for applying a predetermined amount of force acting to urge said positive polarity brush into contact with said positive polarity slip ring circumference, with each of said negative polarity brush and positive polarity brush having an operating life that is determined by a degree of wear which occurs due to said sliding contact;

wherein said negative polarity spring is configured to apply a lower level of force to said negative polarity brush than a level of force applied to said positive polarity brush by said positive polarity spring, for rendering said operating lives of said negative polarity brush and positive polarity brush substantially identical to one another.

2. An AC generator as claimed in claim 1, wherein a contact area between said negative polarity brush and said negative polarity slip ring and a contact area between said positive polarity brush and said positive polarity slip ring are made respectively different.

3. An AC generator as claimed in claim 2, wherein said negative polarity brush is formed with different dimensions from those of said positive polarity brush, for rendering said contact area between said negative polarity brush and said negative polarity slip ring larger than said a contact area between said positive polarity brush and said positive polarity slip ring.

4. An AC generator as claimed in claim 3, wherein a width dimension of said negative polarity brush, as measured along a specific direction at right angles to a direction of force applied to said negative polarity brush by said negative polarity spring, is made longer than a corresponding width dimension of said positive polarity brush.

5. An AC generator as claimed in claim 1, wherein respective length dimensions of said negative polarity brush and positive polarity brush, as measured along a direction of force applied to each of said brushes by the corresponding one of said springs, are made different from one another.

6. An AC generator as claimed in claim 5, wherein said length dimension of said negative polarity brush is made larger than said length dimension of said positive polarity brush.

7. An AC generator as claimed in claim 1, wherein said negative polarity brush and positive polarity brush are formed of materials that are constituted differently from one another.

8. An AC generator as claimed in claim 7, wherein said materials each contain a proportion of copper, and wherein said material of said negative polarity brush contains a larger proportion of copper than said material of said positive polarity brush.

9. An AC generator as claimed in claim 1, wherein said negative polarity spring has a larger coil pitch than said positive polarity spring.

10. An AC generator as claimed in claim 1, wherein said negative polarity spring has a smaller diameter than said positive polarity spring.

11. An AC generator as claimed in claim 1, wherein said negative polarity spring is constituted of a material having greater flexibility than a material of said positive polarity spring.

* * * * *